US010659479B2

(12) United States Patent
Hinchliffe et al.

(10) Patent No.: US 10,659,479 B2
(45) Date of Patent: May 19, 2020

(54) DETERMINATION OF SENSOR USAGE

(71) Applicant: McAfee, LLC, Santa Clara, CA (US)

(72) Inventors: Alexander J. Hinchliffe, San Jose, CA (US); Pablo R. Passera, San Jose, CA (US); Ranjith Kumar Jidigam, San Jose, CA (US); Alger Wan Kwong Yeung, Pleasanton, CA (US); Simon Hunt, Naples, FL (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/672,059

(22) Filed: Mar. 27, 2015

(65) Prior Publication Data

US 2016/0285903 A1  Sep. 29, 2016

(51) Int. Cl.
*H04L 29/06* (2006.01)
*G06F 21/55* (2013.01)
*H04L 29/08* (2006.01)
*G06F 16/2455* (2019.01)
*H04W 12/12* (2009.01)

(52) U.S. Cl.
CPC .... H04L 63/1425 (2013.01); G06F 16/24568 (2019.01); G06F 21/554 (2013.01); H04L 63/1416 (2013.01); H04L 67/12 (2013.01); H04W 12/1208 (2019.01); *H04L 63/168* (2013.01)

(58) Field of Classification Search
CPC ............. H04L 63/1425; H04L 63/1416; G06F 17/30516; G06F 21/554; H04W 12/12
See application file for complete search history.

(56) References Cited

U.S. PATENT DOCUMENTS 5,416,725 A * 5/1995 Pacheco ................. G08B 25/14
340/5.54
5,987,610 A  11/1999 Franczek et al.
(Continued)

FOREIGN PATENT DOCUMENTS

JP  2007524878 A  8/2007
JP  2010512576 A  4/2010
(Continued)

OTHER PUBLICATIONS

Jover R.P., Murynets I., Bickford J. (2015) Detecting Malicious Activity on Smartphones Using Sensor Measurements. In: Qiu M., Xu S., Yung M., Zhang H. (eds) Network and System Security. NSS 2015. Lecture Notes in Computer Science, vol. 9408. Springer, Cham.*
(Continued)

*Primary Examiner* — Samson B Lemma
*Assistant Examiner* — Richard W Cruz-Franqui
(74) *Attorney, Agent, or Firm* — Patent Capital Group

(57) ABSTRACT

Particular embodiments may include a system, apparatus, method, and/or machine readable storage medium for determining sensor usage by: detecting, at a level below an operating system executing on a computing device, one or more requests from an application to access one or more sensors associated with the computing device; determining, based on the one or more requests from the application to access the one or more sensors, that the application requested unexpected access to the one or more sensors; and performing a remedial action in response to the unexpected access requested by the application.

18 Claims, 7 Drawing Sheets

(56) References Cited

U.S. PATENT DOCUMENTS

| | | | |
|---|---|---|---|
| 6,073,142 A | 6/2000 | Geiger et al. | |
| 6,460,050 B1 | 10/2002 | Pace et al. | |
| 7,313,821 B1* | 12/2007 | Steiner | G06F 21/554 |
| | | | 714/E11.207 |
| 7,506,155 B1 | 3/2009 | Stewart et al. | |
| 7,627,312 B2* | 12/2009 | Varadarajan | G06F 11/263 |
| | | | 455/420 |
| 7,900,194 B1* | 3/2011 | Mankins | G06F 21/552 |
| | | | 717/127 |
| 8,402,174 B2* | 3/2013 | Memmott | G06Q 10/04 |
| | | | 710/15 |
| 8,495,188 B2* | 7/2013 | Matsumoto | H04L 41/50 |
| | | | 709/223 |
| 8,655,307 B1* | 2/2014 | Walker | H04W 72/0493 |
| | | | 455/405 |
| 8,819,495 B2* | 8/2014 | Martin | G06F 11/3672 |
| | | | 714/38.1 |
| 8,959,638 B2* | 2/2015 | Sallam | G06F 21/566 |
| | | | 726/23 |
| 9,152,787 B2* | 10/2015 | Gathala | G06F 21/56 |
| 9,223,962 B1* | 12/2015 | Kashyap | G06F 21/566 |
| 9,275,223 B2* | 3/2016 | Kapoor | G06F 21/554 |
| 2003/0101078 A1* | 5/2003 | Voegeli | A61B 5/0002 |
| | | | 705/2 |
| 2005/0144343 A1 | 6/2005 | Hamdan | |
| 2007/0079178 A1* | 4/2007 | Gassoway | G06F 21/566 |
| | | | 714/38.14 |
| 2008/0073431 A1 | 3/2008 | Davis | |
| 2008/0127344 A1* | 5/2008 | Sallam | G06F 21/52 |
| | | | 726/23 |
| 2009/0125918 A1* | 5/2009 | Kansal | H04L 67/16 |
| | | | 719/328 |
| 2009/0320143 A1* | 12/2009 | Gear | G06F 9/468 |
| | | | 726/29 |
| 2012/0066681 A1* | 3/2012 | Levy | G06F 9/5027 |
| | | | 718/1 |
| 2012/0254995 A1* | 10/2012 | Sallam | G06F 21/554 |
| | | | 726/22 |
| 2012/0255010 A1* | 10/2012 | Sallam | G06F 21/572 |
| | | | 726/24 |
| 2012/0278268 A1* | 11/2012 | Hamalainen | G06F 16/9535 |
| | | | 706/46 |
| 2013/0174211 A1* | 7/2013 | Aad | G06F 21/604 |
| | | | 726/1 |
| 2013/0219228 A1* | 8/2013 | Martin | G06F 11/3672 |
| | | | 714/45 |
| 2013/0247187 A1* | 9/2013 | Hsiao | G06F 21/552 |
| | | | 726/22 |
| 2013/0304676 A1* | 11/2013 | Gupta | G06N 20/00 |
| | | | 706/12 |
| 2014/0053260 A1* | 2/2014 | Gupta | G06F 21/50 |
| | | | 726/22 |
| 2014/0123289 A1* | 5/2014 | Hsiao | G06F 21/552 |
| | | | 726/23 |
| 2014/0181908 A1 | 6/2014 | Doris-Down et al. | |
| 2015/0082430 A1* | 3/2015 | Sridhara | G06F 21/566 |
| | | | 726/23 |
| 2015/0128265 A1* | 5/2015 | Jover | H04L 63/1425 |
| | | | 726/23 |
| 2015/0161024 A1* | 6/2015 | Gupta | G06F 11/3612 |
| | | | 714/47.3 |
| 2015/0161386 A1* | 6/2015 | Gupta | G06F 11/3612 |
| | | | 726/23 |
| 2015/0163121 A1* | 6/2015 | Mahaffey | G06F 11/0709 |
| | | | 707/687 |
| 2015/0222636 A1* | 8/2015 | Mahaffey | G06F 21/564 |
| | | | 726/4 |
| 2015/0249925 A1* | 9/2015 | Haro | H04W 4/029 |
| | | | 455/410 |
| 2015/0286820 A1* | 10/2015 | Sridhara | G06F 21/566 |
| | | | 726/23 |
| 2015/0350255 A1* | 12/2015 | Robinson | H04L 63/20 |
| | | | 726/1 |
| 2016/0006861 A1* | 1/2016 | Hodges | H04M 1/72577 |
| | | | 455/405 |
| 2016/0078362 A1* | 3/2016 | Christodorescu | G06F 21/566 |
| | | | 706/12 |
| 2016/0094558 A1* | 3/2016 | Lal | G06F 21/6218 |
| | | | 713/171 |
| 2016/0205115 A1* | 7/2016 | Kulkarni | G06F 21/568 |
| | | | 726/1 |
| 2016/0212156 A1* | 7/2016 | Choi | H04L 63/1425 |
| 2016/0285903 A1* | 9/2016 | Hinchliffe | H04L 63/1425 |

FOREIGN PATENT DOCUMENTS

| | | |
|---|---|---|
| JP | 2011527046 A | 10/2011 |
| JP | 2013182500 A | 9/2013 |
| WO | 2014063133 A1 | 4/2014 |
| WO | 2016160219 A1 | 10/2016 |

OTHER PUBLICATIONS

An Android Application Sandbox System for Suspicious Software Detection (Bläsing) (Year: 2010).*

NPL Search (Google Scholar) (Year: 2019).*

Thomas Bläsing et al, An Android Application Sandbox System for Suspicious Software Detection (Bläsing) (Year: 2010).*

Is Android really just Linux? Downloaded from https://web.archive.org/web/20170706103346/https://www.androidauthority.com/android-linux-784964/ (Year: 2017).*

International Search Report and Written Opinion in International Application No. PCT/US2016/019982, dated Jun. 29, 2016, 11 pages.

PCT Notification Concerning Transmittal of International Preliminary Report on Patentability (Chapter 1) dated Oct. 3, 2017 in International Application No. PCT/US2016/019982, dated Oct. 12, 2017, 10 pages.

EPO Jul. 19, 2018 Extended European Search Report from counterpart European Application No. 16773684.2 dated Jul. 19, 2018; 9 pages.

JPO Aug. 17, 2018 Notice of Reasons for Refusal from counterpart Japanese Application No. 2018-501136 dated Aug. 17, 2018 [English translation included]; 9 pages.

Liu, He, et al., "Software Abstractions for Trusted Sensors," Proceedings of the 10th International Conference on Mobile Systems, Applications and Services (MOBISYS), Jun. 25, 2012; 14 pages.

JPO Mar. 14, 2019 Decision of Rejection from counterpart Japanese Application No. 2018-501136; 1 page [No translation available].

* cited by examiner

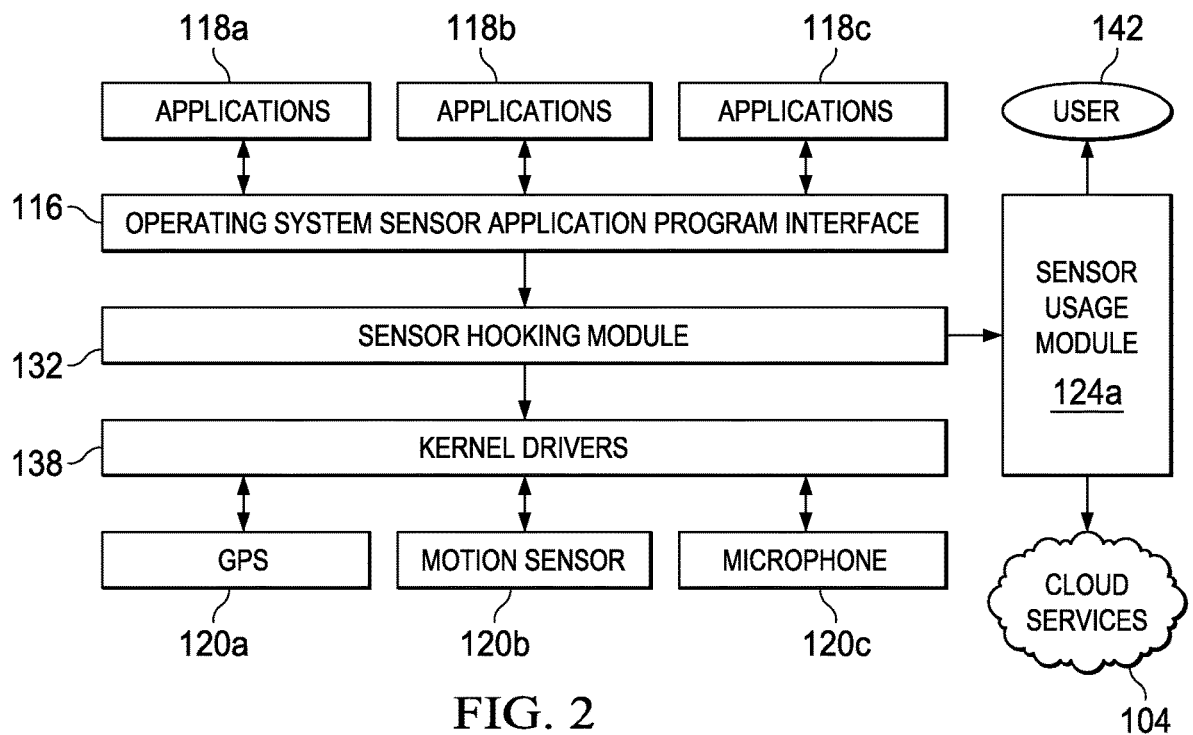
FIG. 2
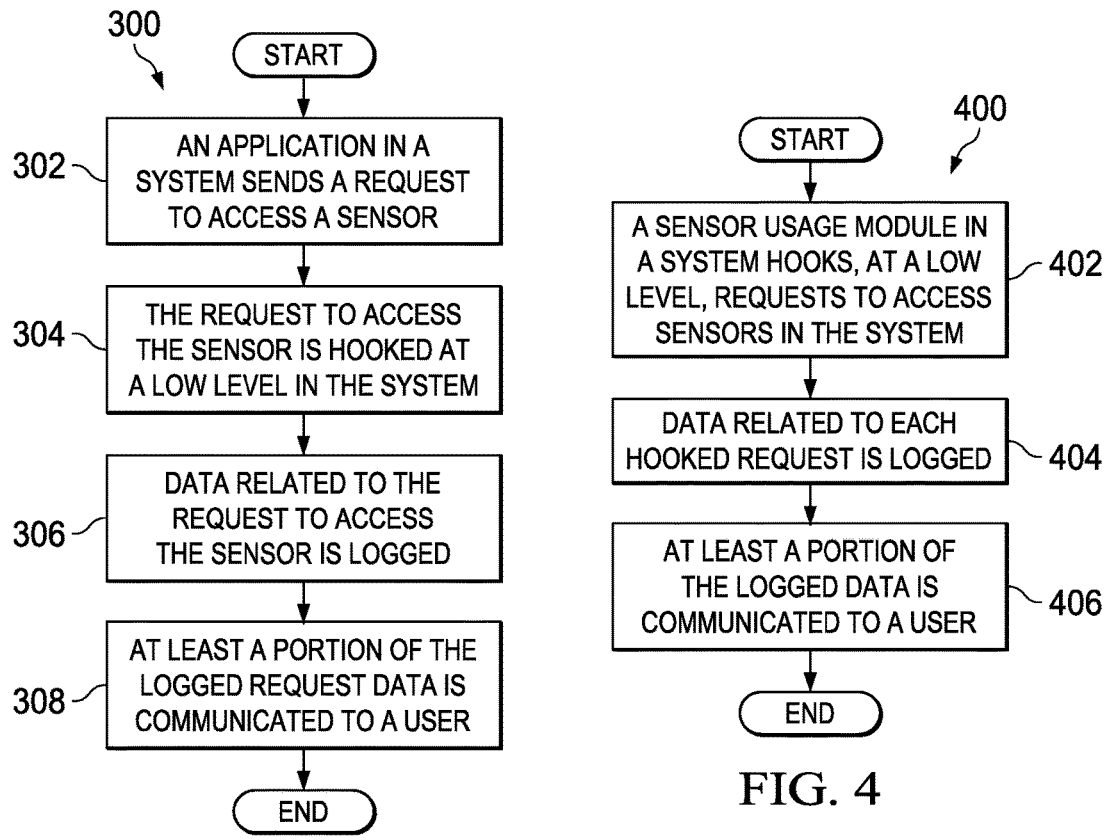
FIG. 3
FIG. 4

DETERMINATION OF SENSOR USAGE

TECHNICAL FIELD

This disclosure relates in general to the field of electronic devices, and more particularly, to a determination of sensor usage.

BACKGROUND

End users have more electronic device choices than ever before. A number of prominent technological trends are currently afoot (e.g., more computing devices, more detachable displays, more peripherals, etc.), and these trends are changing the electronic device landscape. One of the technological trends is the use of sensors in electronic devices. In many instances, a sensor in an electrical device may be in use without a user knowing what application accessed the sensor or how often the sensor is being used. Hence, there is a challenge in providing an electronic device that allows for a determination of sensor usage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram of illustrating an embodiment of a communication system in accordance with an embodiment of the present disclosure;

FIG. 3 is a simplified flowchart illustrating potential operations that may be associated with the communication system in accordance with an embodiment;

FIG. 4 is a simplified flowchart illustrating potential operations that may be associated with the communication system in accordance with an embodiment;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
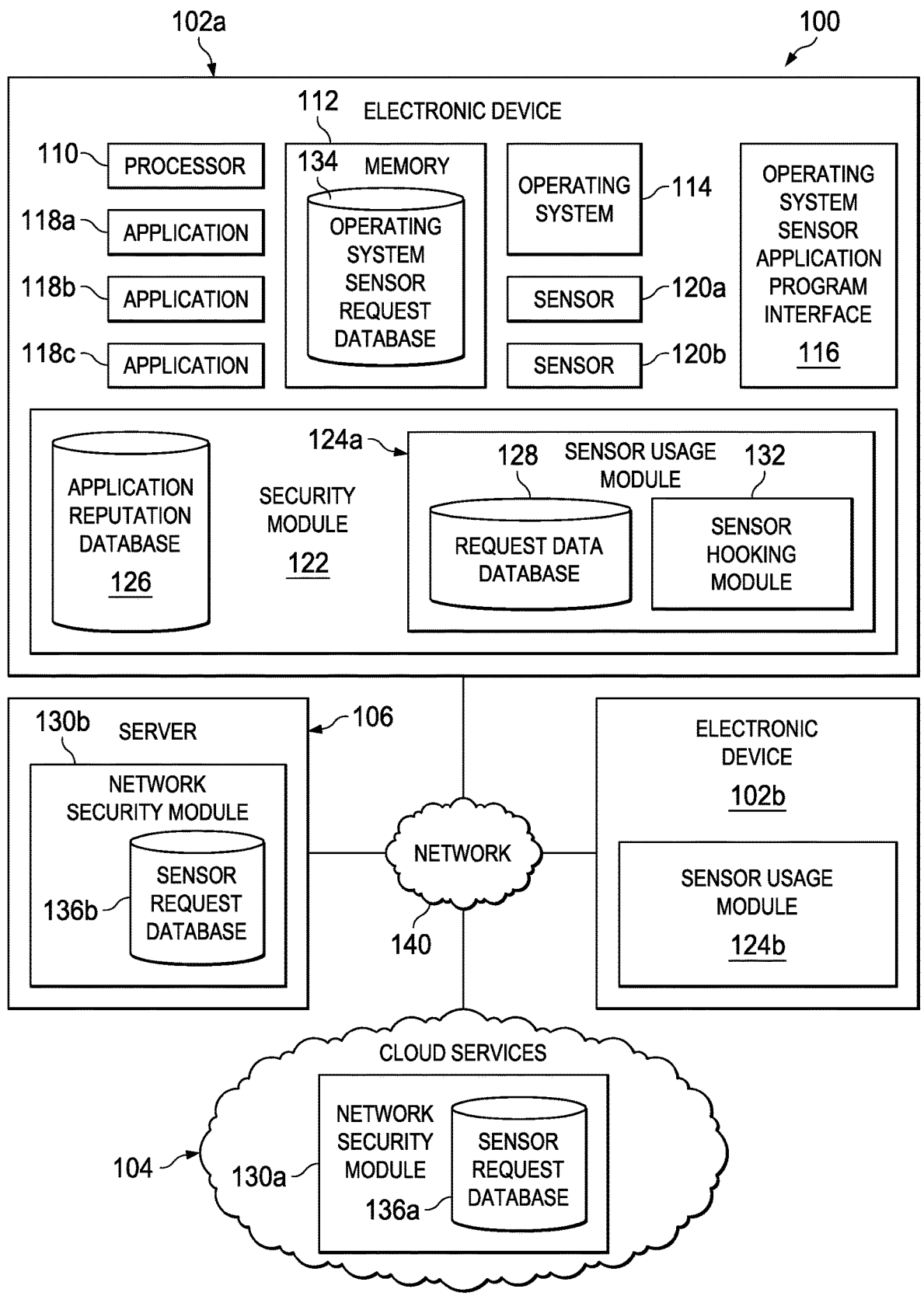
FIG. 1 is a simplified block diagram of illustrating an embodiment of a communication system in accordance with an embodiment of the present disclosure.

FIG. 1 is a simplified block diagram of an embodiment of communication system 100 to determine sensor usage in accordance with an embodiment of the present disclosure. Communication system 100 can include electronic devices 102a and 102b, cloud services 104, and a server 106. Electronic device 102a can include a processor 110, memory 112, operating system (OS) 114, OS sensor application program interface (API) 116, one or more applications 118a-118c, one or more sensors 120a and 120b, and a security module 122. Memory 112 can include an OS sensor request database 134. Security module 122 can include a sensor usage module 124a and an application reputation database 126. Sensor usage module 124a can include a request data base 128 and a sensor hooking module 132. Electronic device 102b can include a sensor usage module 124b as well as similar elements illustrated in electronic device 102a. Cloud services 104 can include network security module 130a. Network security module 130a can include a sensor request database 136a. Server 106 can include network security module 130b. Network security module 130b can include a sensor request database 136b. Electronic devices 102a and 102b, cloud 104, and server 106 may be in communication using network 140.

In example embodiments, communication system 100 can be configured to hook, at a low level in the system, requests to access a sensor and log data related to the requests. For example, sensor hooking module 132 may be configured to hook sensor requests and the data can be logged in request database 128. The logged data can be used to provide accurate information to a user about what applications are accessing what sensors, for how long, and for what purpose. In addition, communication system 100 can hook a low-level kernel, monitor an application's use of a sensor, and monitor the application's use of the sensor from OS level APIs. For example, an application may use OS sensor API 116 to access a sensor and data related to the access may be logged in OS sensor request database 134. The data in OS sensor request database 134 can be compared to the data in request database 128 for anomalies to detect malicious applications that attempt to disguise their behavior. Communication system 100 can also be configured to aggregate information about sensor usage and applications from multiple devices at a network component and create a reputation for each application. For example, multiple devices (e.g., electronic devices 102a and 102b) may send logged sensor data to network security module 130a and 130b and the data may be stored in sensor request database 136a and 136b respectively for further analysis.

Elements of FIG. 1 may be coupled to one another through one or more interfaces employing any suitable connections (wired or wireless), which provide viable pathways for network (e.g., network 140) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Many of today's electronic devices, especially mobile devices, include sensors. The term "sensor" as used herein includes devices or sensors that measure motion, orientation, and various environmental conditions. For example, motion sensors include accelerometers, gravity sensors, gyroscopes, and rotational vector sensors. Environmental sensors include sensors that measure various environmental parameters, such as ambient air temperature and pressure, illumination, and humidity and can include barometers, photometers, and thermometers. Position sensors include sensors that can measure the physical position of a device such as orientation sensors and magnetometers. Some sensors are hardware-based and some sensors are software-based. Hardware-based sensors are physical components built into an electronic device. They can derive their data by directly measuring specific environmental properties, such as acceleration, geomagnetic field strength, angular change, etc. Software-based sensors are not physical devices but often mimic hardware-based sensors. Software-based sensors typically derive their data from one or more hardware-based sensors and are sometimes called virtual sensors or synthetic sensors (e.g., a linear acceleration sensor, gravity sensor, etc.). All of these are included in the broad term "sensor."

Often, an application will run on an electronic device but a user is unaware of what sensors are being used by the application, for how long, and for what purpose. Icons on the electronic device may describe that a sensor is live or being used but the user may not have recently launched an application or the sensor may be in use by multiple applications and so the user does not know what application is using the sensor or why. In addition, nefarious applications may hide sensor usage in order to maliciously obtain data. What is needed is a system and method of detecting and measuring sensor usage. It would be beneficial if the detecting and measuring occurred at a low level in the system in order to compare with the reported usage by the OS within the system to discover discrepancies which could be an indicator of suspicious behavior.

A communication system, as outlined in FIG. 1 can resolve these issues (and others). Communication system 100 may be configured to include a sensor usage module (e.g., sensor usage module 124a) to determine, at a low level (e.g., lower-level kernel and hardware interfaces) in the system, when a sensor is accessed. For example, sensor usage information can be obtained at a low level in a system (e.g., using sensor hooking module 132) of an electronic device to provide information about which applications are using what sensors. The sensor usage information can be obtained below the classic OS supplied information to prevent sensor use from being hidden by rogue applications.

In addition, sensor usage can be collected through typical OS routes (e.g., from OS API 116) and the two results can be compared to look for evidence of suspicious behavior. The information about sensor usage by applications can be collectively aggregated (e.g., in sensor request data bases 136a and 136b) across multiple devices (e.g., electronic devices 102a and 102b) at a network element (e.g., cloud services 104 or server 106) to obtain information on unexpected usage and may be used to take action on devices to block or remove applications. The collected information can help a user to better understand which applications are using what sensors, for what reasons, for how long, etc. This can help identify potentially suspicious behavior of applications that might somehow be disguising their sensor usage, or in some cases, use of a sensor when the user doesn't expect such use (e.g., as in a background task).

Furthermore, a reputation system (e.g., network security module 130a or 130b) can provide trusted information about the behavior of applications. This trusted information could be used in conjunction with execution data from a device itself that is running one or more of the applications to compare and warn users of suspicious behaviors. Reputation scores can be correlated with data gathered on a device to detect malicious activity.

Turning to the infrastructure of FIG. 1, communication system 100 in accordance with an example embodiment is shown. Generally, communication system 100 can be implemented in any type or topology of networks. Network 140 represents a series of points or nodes of interconnected communication paths for receiving and transmitting packets of information that propagate through communication system 100. Network 140 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a and 102b, cloud services 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic devices 102a and 102b, cloud services 104, and server 106 can include memory elements (e.g., memory 112) for storing information to be used in the operations outlined herein. Each of electronic devices 102a and 102b, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic devices 102a and 102b, cloud services 104, and server 106 may include software modules (e.g., sensor usage module 124a and 124b and network security module 130a and 130b) to achieve, or to foster, operations as outlined herein. These modules may be suitably combined in any appropriate manner, which may be based on particular configuration and/or provisioning needs. In an embodiment, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic devices 102a and 102b, cloud services 104, and server 106 may include a processor (e.g., processor 110) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102a and 102b may each be a network element and include, for example, desktop computers, laptop computers, Internet of things (IoT) devices, mobile devices, personal digital assistants, smartphones, tablets, or other similar devices. Server 106 can be a network element such as a server or virtual server and can be associated with clients, customers, endpoints, or end users wishing to initiate a communication in communication system 100 via some network (e.g., network 140). The term 'server' is inclusive of devices used to serve the requests of clients and/or perform some computational task on behalf of clients within communication system 100. Cloud services 104 is configured to provide cloud services to electronic devices 102a and 102b. Cloud services may generally be defined as the use of computing resources that are delivered as a service over a network, such as the Internet. Typically, compute, storage, and network resources are offered in a cloud infrastructure, effectively shifting the workload from a local network to the cloud network.

Turning to FIG. 2, FIG. 2 is a simplified block diagram of an embodiment of communication system 100 to determine sensor usage in accordance with an embodiment of the present disclosure. In a specific example, application 118a may request to access sensor 120a (illustrated as a global positioning sensor (GPS)). The request to access sensor 120a is communicated to OS sensor API 116 where the request may be logged by OS 114 in OS sensor request database 134 (shown in FIG. 1). Sensor hooking module 132 may hook the request and communicate data related to the request to sensor usage module 124a where the request may be logged in request database 128 (shown in FIG. 1). The request to access sensor 120a may be communicated to kernel drivers 138 and on to sensor 120a.

Sensor usage module 124a can be configured to display the log data to a user 142 and to proxy the data to a network element (e.g., cloud services 104 or server 106). Sensor usage module 124a can determine (in a trusted way) which applications accessed a sensor and provide an application reputation to user 142 for each application. For example, if a GPS sensor has been used by an application, sensor usage module 124a can provide information about which application used the sensor, for how long, what data was retrieved, and the reputation of the application. In one example, a trusted travel application may access a GPS sensor for two hours and retrieve a longitude and a latitude of electronic device 102. In another example, an untrusted travel application may access a sound sensor or microphone for one hour and retrieve voice data of user 142. The untrusted travel application may not have used the OS's APIs to access the sound sensor and the access may not have been detected by the OS. By comparing logged data in OS sensor request database 134 with logged data in request data database 128, discrepancies can be identified and malicious applications may be identified.

Sensor usage module 124a can provide user 142 with local usage reports and alerts about which applications are using what sensors, for how long, and provide options for the user to intervene and limit or block an application's access to a sensor. In addition, sensor usage module 124a can gather information about the reputation of a given application from network security module 130a and 130b, which includes a trust and privacy reputation and provides a rating for the maliciousness of an application or a data exposure level.

Network security module 130a and 130b can provide the applications reputation that is used by sensor usage module 124a. Network security module 130a and 130b can allow extending of the information regarding an application to show what sensors are being accessed by the application, how long the sensors are accessed, what type of data is being used, etc. For instance, network security module 130a and 130*b* could determine the number of times an application accesses a GPS sensor per day, how long the GPS sensor is accessed, estimating battery consumption based on the access, etc. Network security module 130*a* and 130*b* can include results of correlations between the expected behavior of an application with respect to sensors and the behavior experienced by the application on a specific electronic device. For example, a flashlight application may access a GPS sensor on one electronic device, but does not access the GPS sensor on other devices. Such correlations may describe disparity between the two behaviors and possibly indicate suspicious activities.

Turning to FIG. 3, FIG. 3 is an example flowchart illustrating possible operations of a flow 300 that may be associated with a determination of sensor usage in accordance with an embodiment. In an embodiment, one or more operations of flow 300 may be performed by one or both of sensor usage module 124*a* and sensor hooking module 132. At 302, an application in a system sends a request to access a sensor. At 304, the request to access the sensor is hooked at a low level in the system. At 306, data related to the request to access the sensor is logged. At 308, at least a portion of the logged request data is communicated to a user.

Turning to FIG. 4, FIG. 4 is an example flowchart illustrating possible operations of a flow 400 that may be associated with a determination of sensor usage in accordance with an embodiment. In an embodiment, one or more operations of flow 400 may be performed by one or both of sensor usage module 124*a* and sensor hooking module 132. At 402, a sensor usage module in a system hooks, at a low level, requests to access sensors in the system. At 404, data related to each hooked request is logged. At 406, at least a portion of the logged data is communicated to a user.

Figure 5:
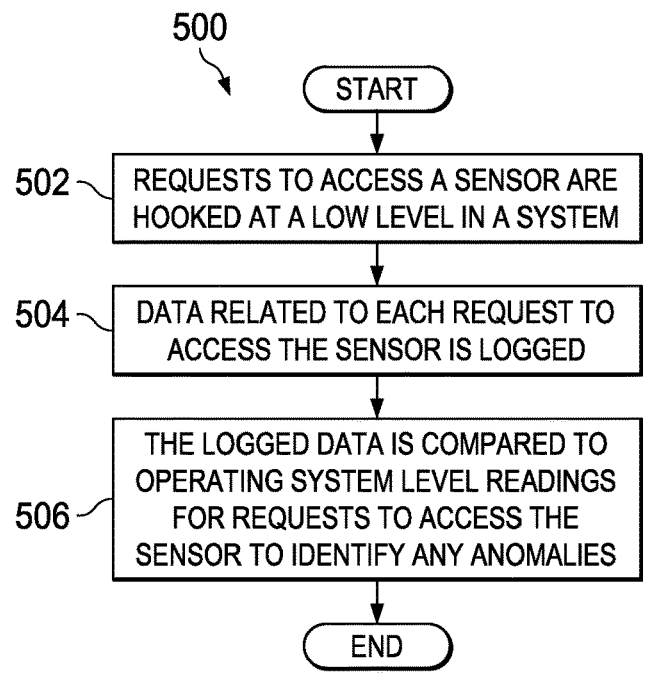
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with a determination of sensor usage in accordance with an embodiment. In an embodiment, one or more operations of flow 500 may be performed by one or both of sensor usage module 124*a* and sensor hooking module 132. At 502, requests to access a sensor are hooked at a low level in a system. At 504, data related to each request to access the sensor is logged. At 506, the logged data is compared to operating system level readings for requests to access the sensor to identify any anomalies.

Figure 6:
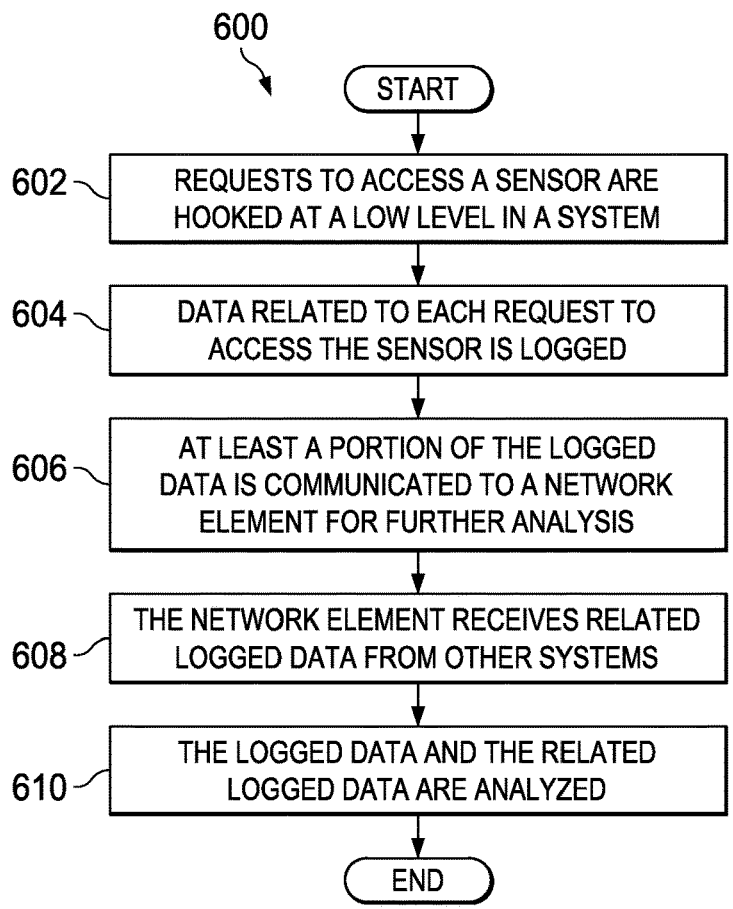
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with a determination of sensor usage in accordance with an embodiment. In an embodiment, one or more operations of flow 600 may be performed by one or both of sensor usage module 124*a* and sensor hooking module 132. At 602, requests to access a sensor are hooked at a low level in a system. At 604, data related to each request to access the sensor is logged. At 606, at least a portion of the logged data is communicated to a network element for further analysis. At 608, the network element receives related logged data from other systems. At 610, the logged data and the related logged data are analyzed.

Figure 7:
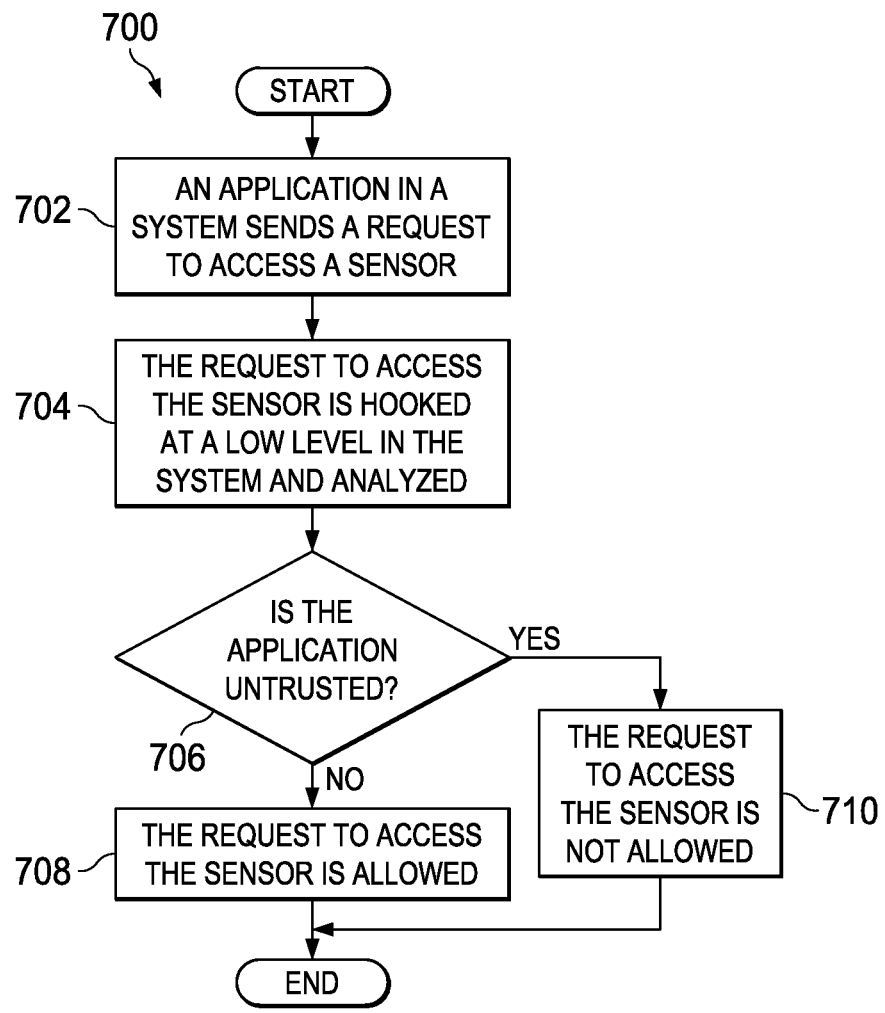
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with a determination of sensor usage in accordance with an embodiment. In an embodiment, one or more operations of flow 700 may be performed by one or both of sensor usage module 124*a* and sensor hooking module 132. At 702, an application in a system sends a request to access a sensor. At 704, the request to access the sensor is hooked at a low level in the system and analyzed. At 706, the system determines if the application is untrusted. If the application is untrusted, then the request to access the sensor is not allowed, as in 710. If the application is not untrusted (e.g., is trusted or benign), then the request to access the sensor is allowed.

Figure 8:
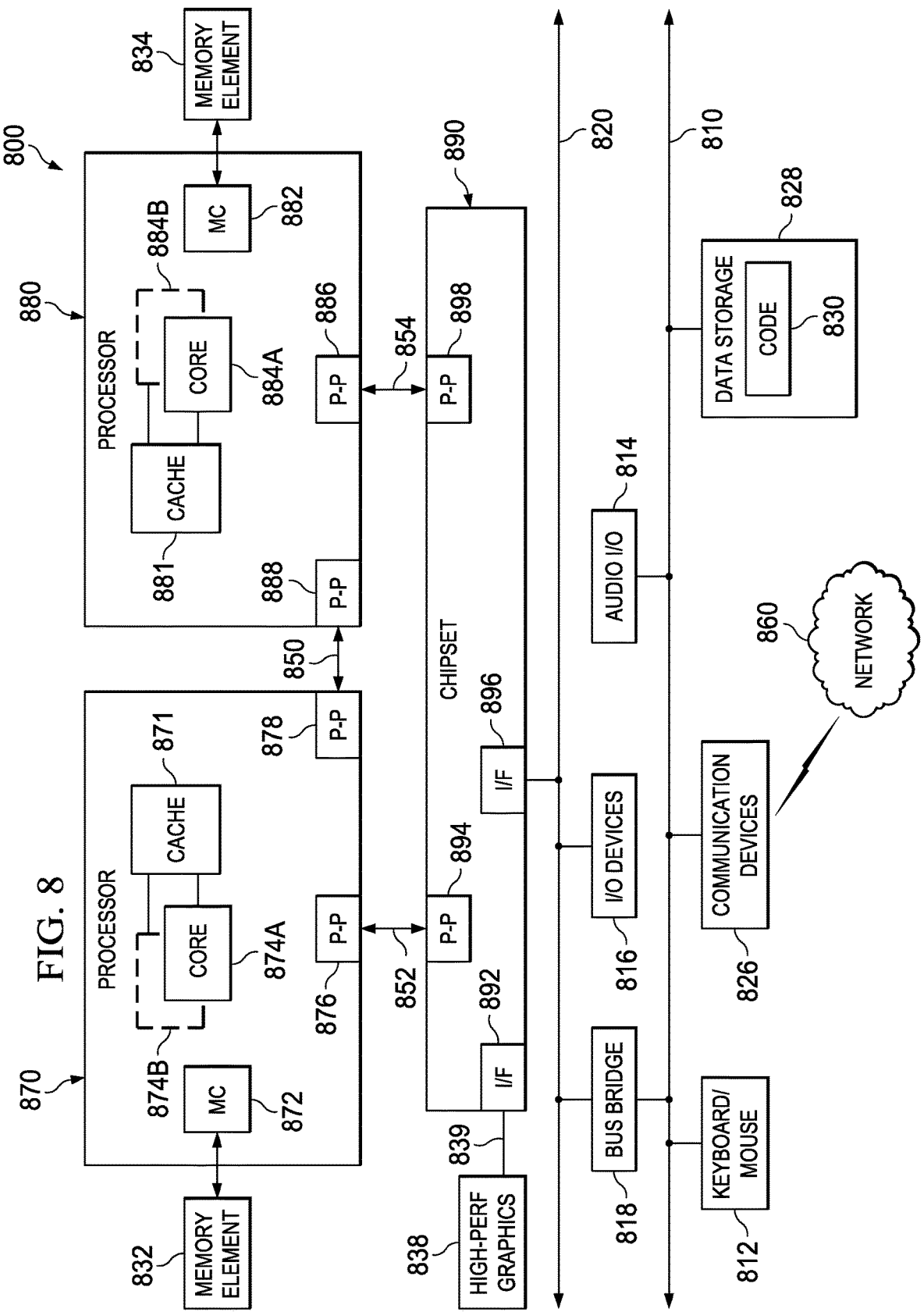
FIG. 8 is a block diagram illustrating an example computing system that is arranged in a point-to-point configuration in accordance with an embodiment.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the network elements of communication system 100 may be configured in the same or similar manner as computing system 800.

As illustrated in FIG. 8, system 800 may include several processors, of which only two, processors 870 and 880, are shown for clarity. While two processors 870 and 880 are shown, it is to be understood that an embodiment of system 800 may also include only one such processor. Processors 870 and 880 may each include a set of cores (i.e., processor cores 874A and 874B and processor cores 884A and 884B) to execute multiple threads of a program. The cores may be configured to execute instruction code in a manner similar to that discussed above with reference to FIGS. 2-6. Each processor 870, 880 may include at least one shared cache 871, 881. Shared caches 871, 881 may store data (e.g., instructions) that are utilized by one or more components of processors 870, 880, such as processor cores 874 and 884.

Processors 870 and 880 may also each include integrated memory controller logic (MC) 872 and 882 to communicate with memory elements 832 and 834. Memory elements 832 and/or 834 may store various data used by processors 870 and 880. In alternative embodiments, memory controller logic 872 and 882 may be discrete logic separate from processors 870 and 880.

Processors 870 and 880 may be any type of processor, and may exchange data via a point-to-point (PtP) interface 850 using point-to-point interface circuits 878 and 888, respectively. Processors 870 and 880 may each exchange data with a control logic 890 via individual point-to-point interfaces 852 and 854 using point-to-point interface circuits 876, 886, 894, and 898. Control logic 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Control logic 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 9:
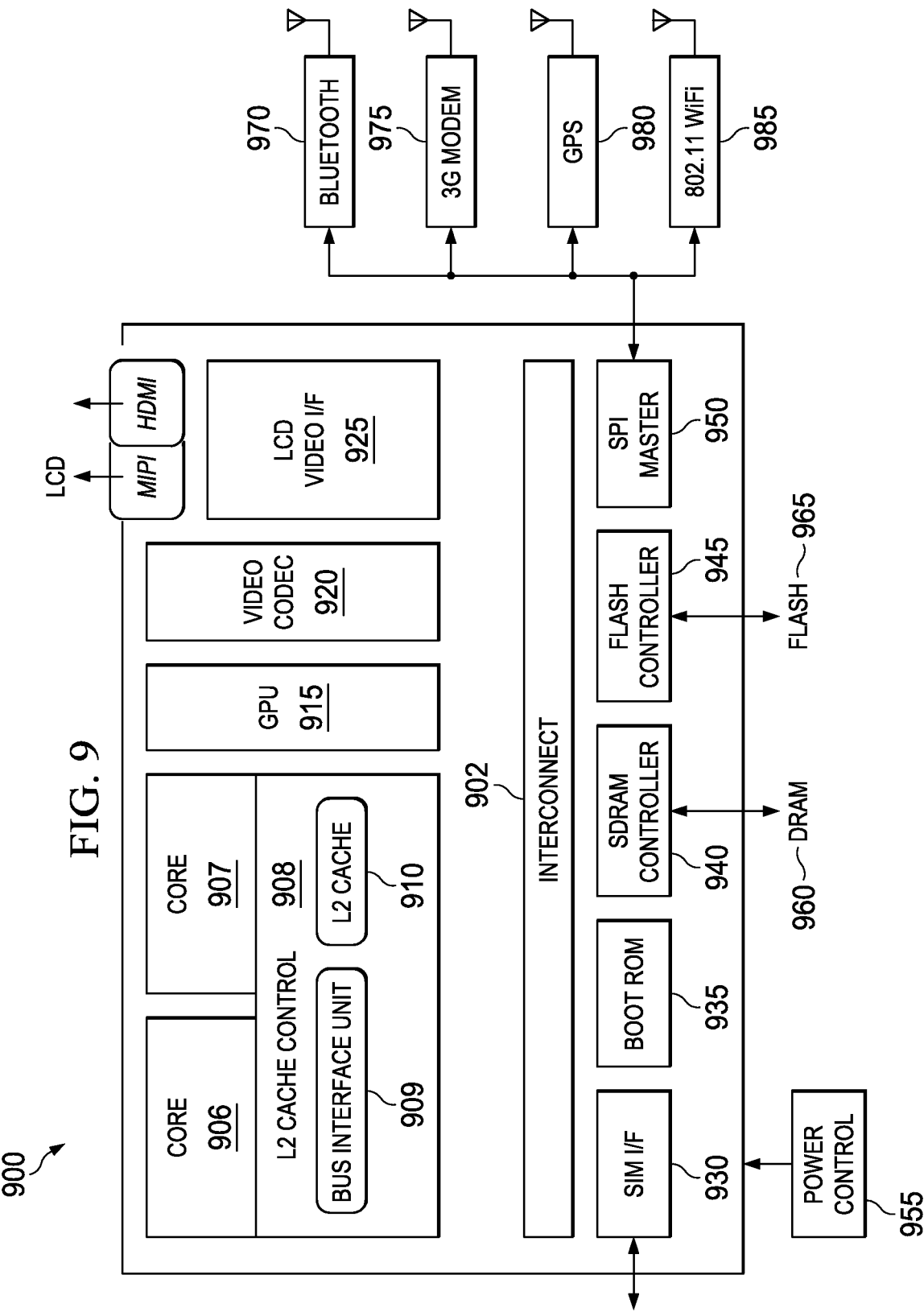
FIG. 9 is a simplified block diagram associated with an example ARM ecosystem system on chip (SOC) of the present disclosure.

Turning to FIG. 9, FIG. 9 is a simplified block diagram associated with an example ARM ecosystem SOC 900 of the present disclosure. At least one example implementation of the present disclosure can include the sensor usage determination features discussed herein and an ARM component. For example, the example of FIG. 9 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 9, ARM ecosystem SOC 900 may include multiple cores 906-907, an L2 cache control 908, a bus interface unit 909, an L2 cache 910, a graphics processing unit (GPU) 915, an interconnect 902, a video codec 920, and a liquid crystal display (LCD) I/F 925, which may be associated with mobile industry processor interface (MIPI)/high-definition multimedia interface (HDMI) links that couple to an LCD.

ARM ecosystem SOC 900 may also include a subscriber identity module (SIM) I/F 930, a boot read-only memory (ROM) 935, a synchronous dynamic random access memory (SDRAM) controller 940, a flash controller 945, a serial peripheral interface (SPI) master 950, a suitable power control 955, a dynamic RAM (DRAM) 960, and flash 965. In addition, one or more embodiments include one or more communication capabilities, interfaces, and features such as instances of Bluetooth™ 970, a 3G modem 975, a global positioning system (GPS) 980, and an 802.11 Wi-Fi 985.

In operation, the example of FIG. 9 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one embodiment, the core processor may implement an out-of-order superscalar pipeline with a coupled low-latency level-2 cache.

Figure 10:
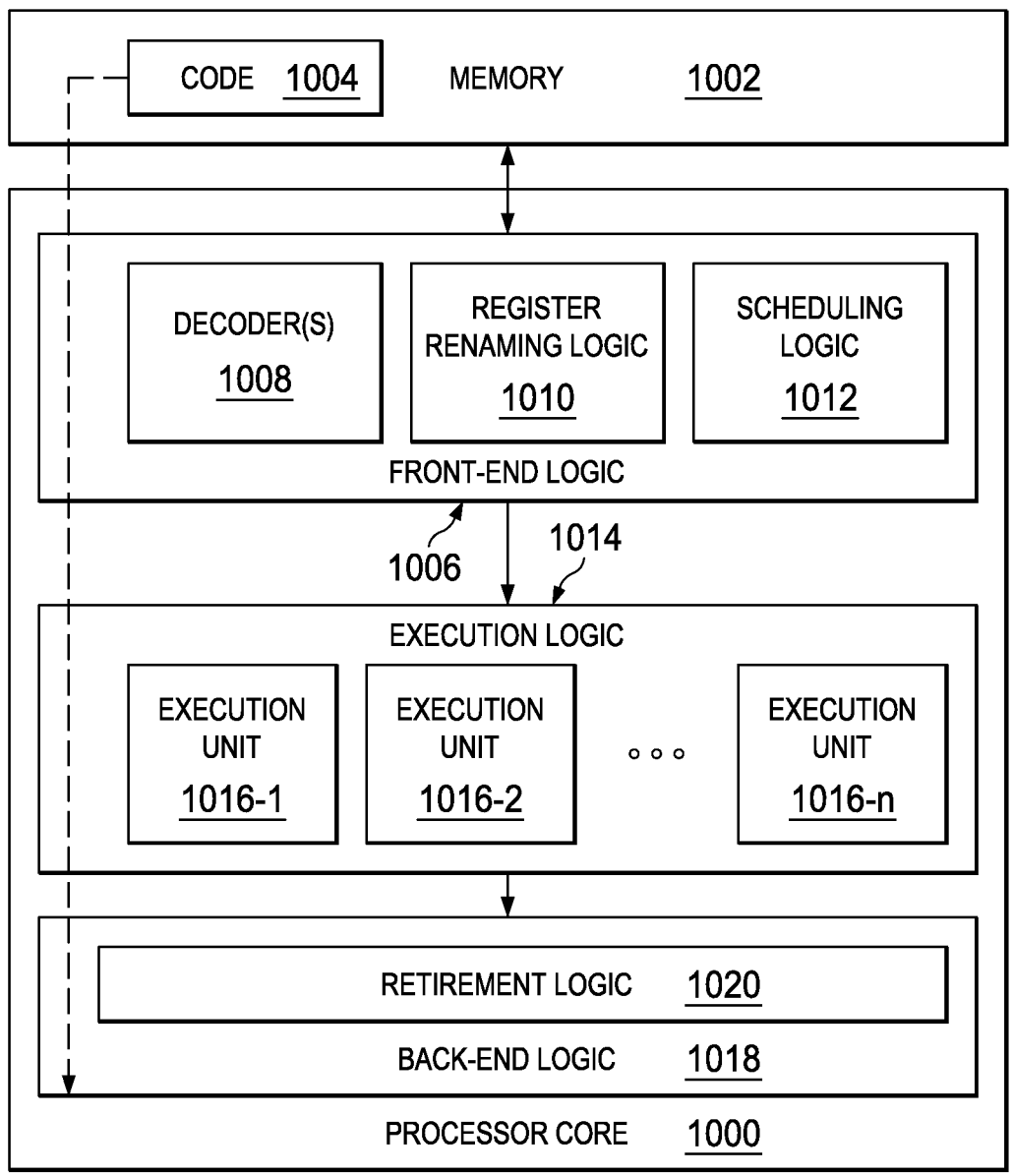
FIG. 10 is a block diagram illustrating an example processor core in accordance with an embodiment.

FIG. 10 illustrates a processor core 1000 according to an embodiment. Processor core 10 may be the core for any type of processor, such as a micro-processor, an embedded processor, a digital signal processor (DSP), a network processor, or other device to execute code. Although only one processor core 1000 is illustrated in FIG. 10, a processor may alternatively include more than one of the processor core 1000 illustrated in FIG. 10. For example, processor core 1000 represents an embodiment of processors cores 874a, 874b, 884a, and 884b shown and described with reference to processors 870 and 880 of FIG. 8. Processor core 1000 may be a single-threaded core or, for at least one embodiment, processor core 1000 may be multithreaded in that it may include more than one hardware thread context (or "logical processor") per core.

FIG. 10 also illustrates a memory 1002 coupled to processor core 1000 in accordance with an embodiment. Memory 1002 may be any of a wide variety of memories (including various layers of memory hierarchy) as are known or otherwise available to those of skill in the art. Memory 1002 may include code 1004, which may be one or more instructions, to be executed by processor core 1000. Processor core 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor core 1000 can also include execution logic 1014 having a set of execution units 1016-1 through 1016-N. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor core 1000 allows out of order execution but requires in order retirement of instructions. Retirement logic 1020 may take a variety of known forms (e.g., re-order buffers or the like). In this manner, processor core 1000 is transformed during execution of code 1004, at least in terms of the output generated by the decoder, hardware registers and tables utilized by register renaming logic 1010, and any registers (not shown) modified by execution logic 1014.

Although not illustrated in FIG. 10, a processor may include other elements on a chip with processor core 1000, at least some of which were shown and described herein with reference to FIG. 8. For example, as shown in FIG. 8, a processor may include memory control logic along with processor core 1000. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 3-7) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100. As used herein, the term "and/or" is to include an and or an or condition. For example, A, B, and/or C would include A, B, and C; A and B; A and C; B and C; A, B, or C; A or B; A or C; B or C; and any other variations thereof.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor cause the at least one processor to receive a request from an application to access a sensor in a system, hook the request below an operating system level in the system, and log data related to the request.

In Example C2, the subject matter of Example C1 can optionally include where the request is hooked at a level below an operating system sensor application program interface in the system.

In Example C3, the subject matter of any one of Examples C1-C2 can optionally include where at least a portion of the logged data is communicated to a user.

In Example C4, the subject matter of any one of Examples C1-C3 can optionally include one or more instructions that when executed by the at least one processor cause the at least one processor to compare the logged data related to the request to logged operating system level data related to the request, and send an alert, when there is a discrepancy between the logged data related to the request and the logged operating system level data related to the request.

In Example C5, the subject matter of any one of Examples C1-C4 can optionally include one or more instructions that when executed by the at least one processor cause the at least one processor to log a plurality of requests from the application to access one or more sensors in the system.

In Example C6, the subject matter of any one of Example C1-05 can optionally include one or more instructions that when executed by the at least one processor cause the at least one processor to communicate the logged plurality of requests to a network element.

In Example C7, the subject matter of any one of Examples C1-C6 can optionally include one or more instructions that when executed by the at least one processor cause the at least one processor to receive a reputation rating for the application from a network element, wherein the reputation rating was created from logged sensor request information for the application, wherein the logged sensor request information was received from a plurality of devices.

In Example C8, the subject matter of any one of Examples C1-C7 can optionally include one or more instructions that when executed by the at least one processor cause the at least one processor to block the request if the reputation rating for the application does not match the request.

In Example A1, an apparatus for determining sensor usage, the apparatus including a sensor usage module configured to receive a request from an application to access a sensor in a system, hook the request below an operating system level in the system, and log data related to the request.

In Example, A2, the subject matter of Example A1 can optionally include where the request is hooked at a level below an operating system sensor application program interface in the system.

In Example A3, the subject matter of any one of Examples A1-A2 can optionally include where at least a portion of the logged data is communicated to a user.

In Example A4, the subject matter of any one of Examples A1-A3 can optionally include where the sensor usage module is further configured to compare the logged data related to the request to logged operating system level data related to the request, and send an alert, when there is a discrepancy between the logged data related to the request and the logged operating system level data related to the request.

In Example A5, the subject matter of any one of Examples A1-A4 can optionally include where the sensor usage module is further configured to log a plurality of requests from the application to access one or more sensors in the system.

In Example A6, the subject matter of any one of Examples A1-A5 can optionally include where the sensor usage module is further configured to communicate the logged plurality of requests to a network element.

In Example A7, the subject matter of any one of Examples A1-A6 can optionally include where the sensor usage module is further configured to receive a reputation rating for the application from a network element, wherein the reputation rating was created from logged sensor request information for the application, wherein the logged sensor request information was received from a plurality of devices.

In Example A8, the subject matter of any one of Examples A1-A7 can optionally include where the sensor usage module is further configured to block the request if the reputation rating for the application does not match the request.

Example M1 is a method receiving a request from an application to access a sensor in a system, hooking the request below an operating system level in the system, and logging data related to the request.

In Example M2, the subject matter of Example M1 can optionally include where the request is hooked at a level below an operating system sensor application program interface in the system.

In Example M3, the subject matter of any one of the Examples M1-M2 can optionally include communicating a least a portion of the logged data to a user.

In Example M4, the subject matter of any one of the Examples M1-M3 can optionally comparing the logged data related to the request to logged operating system level data related to the request, and sending an alert, when there is a discrepancy between the logged data related to the request and the logged operating system level data related to the request.

In Example M5, the subject matter of any one of the Examples M1-M4 can optionally include logging a plurality of requests from the application to access one or more sensors in the system.

In Example M6, the subject matter of any one of the Examples M1-M5 can optionally include communicating the logged plurality of requests to a network element.

In Example M7, the subject matter of any one of the Examples M1-M6 can optionally include receiving a reputation rating for the application from a network element, wherein the reputation rating was created from logged sensor request information for the application, wherein the logged sensor request information was received from a plurality of devices.

Example S1 is a system for determining the usage of one or more sensors, the system including a sensor usage module configured for receiving a request from an application to access a sensor in a system, hooking the request below an operating system level in the system, and logging data related to the request.

In Example S2, the subject matter of Example S1 can optionally include where the request is hooked at a level below an operating system sensor application program interface in the system.

In Example S3, the subject matter of any one of the Examples S1-S2 can optionally include where at least a portion of the logged data is communicated to a user.

In Example S4, the subject matter of any one of the Examples S1-S3 can optionally include comparing the logged data related to the request to logged operating system level data related to the request, and sending an alert, when there is a discrepancy between the logged data related to the request and the logged operating system level data related to the request.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable storage medium comprising one or more instructions that, when executed by at least one processor, cause the at least one processor to perform a method comprising:
   hooking, at a level below an operating system that executes on a computing device, one or more requests to produce hooked one or more requests, wherein the one or more requests are from an application to access one or more sensors included in the computing device, and the one or more sensors include an accelerometer, a gravity sensor, a gyroscope, a rotational vector sensor, a barometer, a photometer, a thermometer, an orientation sensor, a magnetometer, a microphone, or a global positioning sensor;
   identifying, based on the hooked one or more requests, the application and the one or more sensors;
   hooking a kernel to monitor a use by the application of the one or more sensors from an operating system level application program interface to log data related to the hooked one or more requests to produce logged data in a storage structure;
   comparing the logged data in the storage structure to the hooked one or more requests to identify when there is a discrepancy; and
   performing a remedial action when there is the discrepancy.

2. The at least one machine readable storage medium of claim 1, wherein the remedial action is a notification of a user of the access requested by the application.

3. The at least one machine readable storage medium of claim 1, the method further comprising:
   receiving a reputation rating for the application from a network element, wherein the reputation rating is based on logged sensor request information for the application; and
   notifying a user of the reputation rating.

4. The at least one machine readable storage medium of claim 1, wherein the remedial action is a blocking of access from the application to the one or more sensors.

5. The at least one machine readable storage medium of claim 1, the method further comprising:
   communicating one or more requests by the application to the operating system level application program interface to access the one or more sensors.

6. The at least one machine readable storage medium of claim 1, wherein the remedial action is sending an alert.

7. An apparatus for determining sensor usage, comprising:
   a hardware processor configured to
   hook, at a level below an operating system that executes on the apparatus, one or more requests to produce hooked one or more requests, wherein the one or more requests are from an application to access one or more sensors included in the apparatus, and the one or more sensors include an accelerometer, a gravity sensor, a gyroscope, a rotational vector sensor, a barometer, a photometer, a thermometer, an orientation sensor, a magnetometer, a microphone, or a global positioning sensor;
   identify, based on the hooked one or more requests, the application and the one or more sensors;
   hook a kernel to monitor a use by the application of the one or more sensors from an operating system level application program interface to log data related to the hooked one or more requests to produce logged data in a storage structure;
   compare the logged data in the storage structure to the hooked one or more requests to identify when there is a discrepancy; and
   perform a remedial action when there is the discrepancy.

8. The apparatus of claim 7, wherein the processor is further configured to receive a reputation rating for the application from a network element, wherein the reputation rating is based on logged sensor request information for the application, and to notify a user of the reputation rating.

9. The apparatus of claim 7, wherein the remedial action is a notification of a user of the access requested by the application.

10. The apparatus of claim 7, wherein the one or more sensors at least derive data from a hardware-based sensor.

11. The apparatus of claim 7, wherein the one or more sensors measure an acceleration, a geomagnetic field strength, or an angular change.

12. The apparatus of claim 7, wherein the request to access the one or more sensors is communicated to a kernel driver.

13. A method, comprising:
hooking, at a level below an operating system that executes on a computing device, one or more requests to produce hooked one or more requests, wherein the one or more requests are from an application to access one or more sensors included in the computing device, and the one or more sensors include an accelerometer, a gravity sensor, a gyroscope, a rotational vector sensor, a barometer, a photometer, a thermometer, an orientation sensor, a magnetometer, a microphone, or a global positioning sensor;
identifying, based on the hooked one or more requests, the application and the one or more sensors;
hooking a kernel to monitor a use by the application of the one or more sensors from an operating system level application program interface to log data related to the hooked one or more requests to produce logged data in a storage structure;
comparing the logged data in the storage structure to the hooked one or more requests to identify when there is a discrepancy; and
performing a remedial action when there is the discrepancy.

14. The method of claim 13, further comprising
receiving a reputation rating for the application from a network element, wherein the reputation rating is based on logged sensor request information for the application; and
notifying a user of the reputation rating.

15. The method of claim 13, wherein the remedial action is a notification of a user of the access requested by the application.

16. A system for determining sensor usage, comprising:
a processor;
a memory; and
logic stored in the memory, wherein the logic, when executed by the processor, is configured to
hook, at a level below an operating system that executes on the system, one or more requests to produce hooked one or more requests, wherein the one or more requests are from an application to access one or more sensors included in the system, wherein the one or more sensors include an accelerometer, a gravity sensor, a gyroscope, a rotational vector sensor, a barometer, a photometer, a thermometer, an orientation sensor, a magnetometer, a microphone, or a global positioning sensor;
identify, based on the hooked one or more requests, the application and the one or more sensors;
hook a kernel to monitor a use by the application of the one or more sensors from an operating system level application program interface to log data related to the hooked one or more requests to produce logged data in a storage structure;
compare the logged data in the storage structure to the hooked one or more requests to identify when there is a discrepancy; and
perform a remedial action when there is the discrepancy.

17. The system of claim 16, wherein the remedial action is a notification of a user of the access requested by the application.

18. The system of claim 16, wherein the one or more sensors at least derive data from a hardware-based sensor.

* * * * *